(12) United States Patent
Humphrey

(10) Patent No.: US 9,747,676 B2
(45) Date of Patent: Aug. 29, 2017

(54) ADAPTIVE NOISE FILTER

(71) Applicant: Li-Cor, Inc., Lincoln, NE (US)

(72) Inventor: Patrick G. Humphrey, Lincoln, NE (US)

(73) Assignee: Li-Cor, Inc., Lincoln, NE (US)

(*) Notice: Subject to any disclaimer, the term of this patent is extended or adjusted under 35 U.S.C. 154(b) by 0 days.

(21) Appl. No.: 15/076,477

(22) Filed: Mar. 21, 2016

(65) Prior Publication Data

US 2016/0267633 A1 Sep. 15, 2016

Related U.S. Application Data

(62) Division of application No. 14/444,392, filed on Jul. 28, 2014, now Pat. No. 9,384,538.

(Continued)

(51) Int. Cl.
*G06K 9/00* (2006.01)
*G06T 5/40* (2006.01)
(Continued)

(52) U.S. Cl.
CPC .............. *G06T 5/40* (2013.01); *G06T 5/002* (2013.01); *G06T 5/20* (2013.01); *G06T 7/0002* (2013.01); *G06T 7/11* (2017.01); *G06T 2207/20021* (2013.01); *G06T 2207/20028* (2013.01); *G06T 2207/20076* (2013.01); *G06T 2207/20182* (2013.01); *G06T 2207/20192* (2013.01)

(58) Field of Classification Search
CPC . G06T 2207/20021; G06T 2207/20076; G06T 2207/20182; G06T 2207/20192; G06T 7/0081; G06T 5/20; G06T 5/40; G06T 7/0002; G06T 7/11; G06T 2207/20028; G06T 5/002; G06K 9/00771; G06K 9/50
USPC .................................................. 382/170, 173
See application file for complete search history.

(56) References Cited

U.S. PATENT DOCUMENTS 5,594,807 A 1/1997 Liu
5,901,240 A 5/1999 Luo
(Continued)

FOREIGN PATENT DOCUMENTS

WO    WO 98/37738 A1    8/1998
WO    WO 2010/123428 A1    10/2010
WO    WO 2013/124312 A1    8/2013

OTHER PUBLICATIONS

Buyue, Zhang et al., "Adaptive Bilateral Filter for Sharpness Enhancement and Noise Removal", *IEEE Transactions on Image Processing*, IEEE Service Center, Piscataway, NJ, US; vol. 15, No. 5, May 1, 2008; pp. 664-678.

(Continued)

*Primary Examiner* — Kanjibhai Patel
(74) *Attorney, Agent, or Firm* — Leydig, Voit & Mayer, Ltd; Gerald T. Gray

(57) ABSTRACT

A method for applying a filter to data to improve data quality and/or reduce file size. In one example, a region of interest of an image is identified. A histogram is generated of pixel intensity values in the region of interest. The histogram is iteratively updated to focus (zoom) in on the highest peak in the histogram. A Gaussian curve is fitted to the updated histogram. A bilateral filter is applied to the images, where parameters of the bilateral filter are based on the parameters of the Gaussian curve.

12 Claims, 15 Drawing Sheets

Related U.S. Application Data

(60) Provisional application No. 61/859,106, filed on Jul. 26, 2013.

(51) Int. Cl.
  *G06T 5/00* (2006.01)
  *G06T 5/20* (2006.01)
  *G06T 7/00* (2017.01)
  *G06T 7/11* (2017.01)

(56) References Cited

U.S. PATENT DOCUMENTS

| | | |
|---|---|---|
| 6,198,845 B1 | 3/2001 | Tse et al. |
| 6,353,674 B1 | 3/2002 | Dewaele |
| 7,010,163 B1 | 3/2006 | Weiss |
| 7,283,652 B2 * | 10/2007 | Mendonca ............ G06T 7/0012 382/128 |
| 7,283,937 B2 | 10/2007 | Goldberg |
| 7,343,193 B2 * | 3/2008 | Block ................ G01R 33/5601 324/306 |
| 7,555,161 B2 | 6/2009 | Haddon et al. |
| 7,840,066 B1 | 11/2010 | Chen |
| 7,920,741 B2 | 4/2011 | Miller et al. |
| 8,073,236 B2 | 12/2011 | Peng et al. |
| 8,081,836 B2 | 12/2011 | Porikli |
| 8,139,888 B2 | 3/2012 | Porikli |
| 8,150,202 B2 | 4/2012 | Mchanty et al. |
| 8,224,109 B2 | 7/2012 | Bosco et al. |
| 8,238,687 B1 | 8/2012 | Lim et al. |
| 8,254,717 B2 | 8/2012 | Velthoven et al. |
| 8,478,064 B2 | 7/2013 | Kass |
| 8,515,131 B2 | 8/2013 | Koch et al. |
| 8,594,445 B2 | 11/2013 | Cox |
| 8,660,352 B2 | 2/2014 | Gish |
| 8,761,539 B2 | 6/2014 | Kerofsky et al. |
| 2002/0054694 A1 * | 5/2002 | Vachtsevanos ...... G01N 21/956 382/111 |
| 2007/0248265 A1 | 10/2007 | Lundstrom et al. |
| 2009/0129671 A1 | 5/2009 | Hu et al. |
| 2010/0104168 A1 * | 4/2010 | Dobbe ............... A61B 5/02007 382/134 |
| 2012/0099779 A1 | 4/2012 | Gupta et al. |
| 2013/0257887 A1 | 10/2013 | Xu et al. |

OTHER PUBLICATIONS

De Silva et al., "A Depth Map Post-Processing Technique for 3D-TV Systems based on Compression Artifact Analysis"; *IEEE Journal of Selected Topics in Signal Processing*; Jan. 1, 2011.

Marcelo, A.C. Viera et al."Filtering of Poisson Noise in Digital Mammography Using Local Statistics and Adaptive Wiener Filter", *Breast Imaging*, Springer Berlin Heidelberg, Berlin; Jul. 8, 2012; pp. 268-275.

Pace, T. et al, "A Multiresolution Approach to Image Enhancement Via Histogram Shaping and Adaptive Wiener Filtering"; *Visual Information Processing XVII*; SPIE vol. 6978; May 12, 2008.

Theerawit, Wiliaprasitporn et al., "Ultrasound b-scans image denoising via expectation maximization-based unsharp masking", 10th International Conference on *Electrical Engineering/Electronics, computer, Telecommunications and Information Technology (ECTI-CON)*; IEEE. May 15, 2013; pp. 1-6.

International Search Report for PCT/US2014/048499 preformed within the European Patent Office (Mailing date Nov. 5, 2014).

Jenson, John R., "Introductory Digital Image Processing (3rd Edition)(Chapter 8)"; *Introductory Digital Image Processing*; May 10, 2004, Prentice Hall, XP055143676 (pp. 266-285).

Ji-Young, Lee et al., "Single-Molecule Detection of Surface-Hybridized Human Papilloma Virus DNA for Quantitative Clinical Screening", *Analytical Chemistry*, vol. 79, No. 21, Nov. 1, 2007; XP055028370 (DD. 8083-8089).

* cited by examiner

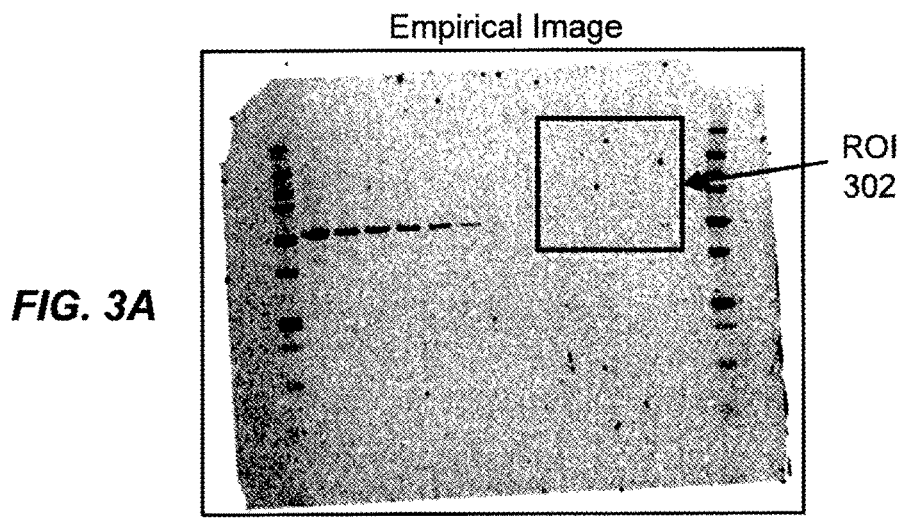
FIG. 3A
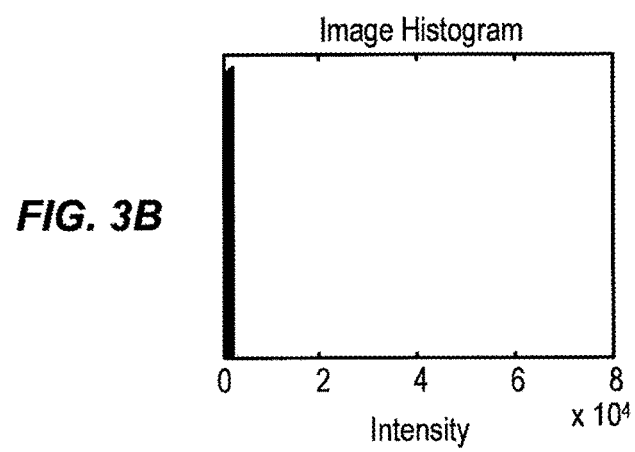
FIG. 3B
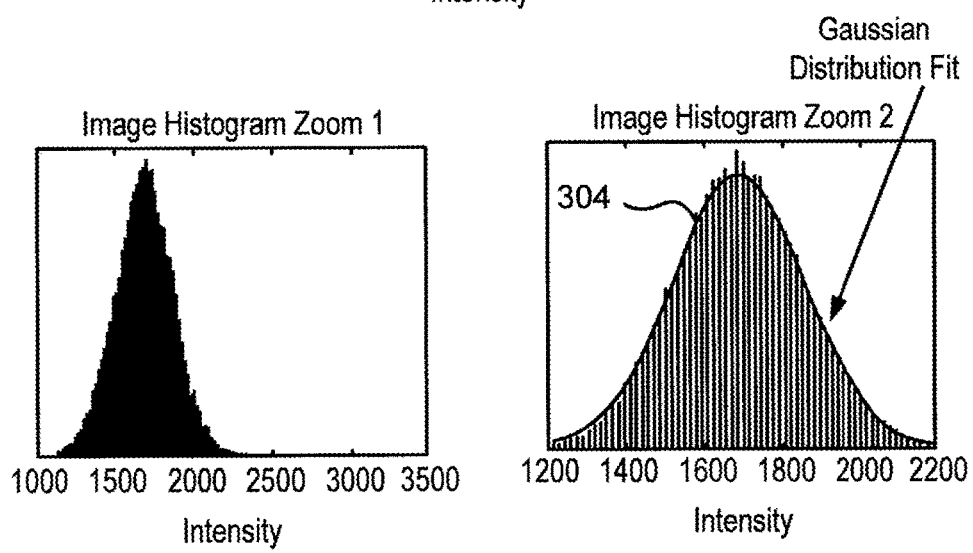
FIG. 3C
FIG. 3D

Image Segment Quality Factors

Quality Ratio #1: Histogram Intensity Match Ratio $$Q1 = 1 - \frac{\sum_{i=1}^{n} |Delta_i|}{\sum_{i=1}^{n} GaussFit_i}$$

$Delta_i = HistCounts_i - GaussFit_i$ $n = number\ of\ bins$

Q1 Range (0 – 1): 0 = no match, 1 = perfect match

*FIG. 12A*

Image Segment Quality Factors

Quality Ratio #2: Histogram Frequency Match Ratio $$Q2 = 1 - \frac{\sum_{i=1}^{n-1} |Deriv_i|}{2 * \sum_{i=1}^{n} |Delta_i|}$$

$Delta_i = HistCounts_i - GaussFit_i$ $Deriv_i = Delta_i - Delta_{i+1}$ $n = $ number of bins Q1 Range (0 – 1): 0 = no match, 1 = perfect match

FIG. 12B

ADAPTIVE NOISE FILTER

CROSS-REFERENCE TO RELATED APPLICATIONS

This patent application is a Divisional of U.S. patent application Ser. No. 14/444,392, titled "ADAPTIVE NOISE FILTER", which claims the benefit of U.S. Provisional Patent Application No. 61/859,106, filed Jul. 26, 2013, which are each incorporated by reference.

BACKGROUND

The present disclosure relates to the field of computing, and in particular to methods and apparatus for analyzing and filtering any data stream of trace data or image data that is characterized by Gaussian noise. Examples of types of data include data representing still images, video, and other one-dimensional, two-dimensional, three-dimensional, four-dimensional, and higher-dimensional data sets to produce filtered images.

Traditional image filters reduce noise but distort the image, thereby degrading the integrity of the image. The degradation is more severe in images that have a high dynamic range.

SUMMARY

Embodiments of the disclosure provide techniques for enhancing image quality. According to various embodiments, an adaptive and appropriately tuned bilateral filter is applied to image data. The bilateral filter reduces noise in the image while preserving edges. The bilateral filter includes a set of parameters that is based on or determined from the image data in the image. In some implementations, the set of parameters can vary (widely in some cases) from image to image. Techniques are presented herein to determine the appropriate set of parameters to use when applying the bilateral filter. These techniques provide the ability to enhance image data based on the image data itself without having to compare with data for a reference or second image. Examples of types of data for which embodiments of the present disclosure are useful in enhancing the quality include data representing still images, video, and other one-dimensional, two-dimensional, three-dimensional, four-dimensional, and higher-dimensional data. These techniques also provide improved data compression for the data being processed (e.g., image(s) improved file compression).

One embodiment provides a method for applying a filter to an image. The method includes: selecting a first region (e.g., a region of interest) of the image; generating an initial histogram of pixel intensity values in the region of interest, wherein the histogram includes N bins; identifying a first bin as a bin having a greatest count of pixel intensity values; identifying a left bin as a closest bin to the left of the first bin in the histogram that has a count that is less than a first count percentage of the greatest count; identifying a right bin as a closest bin to the right of the first bin in the histogram that has a count that is less than a second count percentage of the greatest count; generating an updated histogram of pixel intensity values having a range between the identified left bin and identified right bin; fitting a Gaussian curve onto the updated histogram; and applying a filter to the image based on parameters of the Gaussian curve. The method also typically includes outputting or displaying data representing the filtered image data. The method steps are typically implemented in or by one or more processors.

Another embodiment provides a method for selecting a representative region of interest for an input image. The method includes: receiving an input image; dividing the input image into M regions; identifying one or more of the M regions on which to perform local analysis; performing local analysis on each of the one or more identified regions; and selecting one of the one or more identified regions as a representative region based on results of the local analysis. The method steps are typically implemented in or by one or more processors.

In some embodiments a method is provided for applying a filter to an image, wherein the method typically includes selecting a first region (e.g., region of interest) of the image, generating an initial histogram of pixel intensity values in the region of interest, wherein the histogram includes N bins, identifying a first bin as a bin having a greatest count of pixel intensity values, identifying a left bin as a closest bin to the left of the first bin in the histogram that has a count that is less than a first count percentage of the greatest count, identifying a right bin as a closest bin to the right of the first bin in the histogram that has a count that is less than a second count percentage of the greatest count, generating an updated histogram of pixel intensity values having a range between the identified left bin and identified right bin, and fitting a Gaussian curve onto the updated histogram. The method also typically includes applying a filter to the image based on parameters of the Gaussian curve. The method also typically includes outputting or displaying data representing the filtered image data. The method steps are typically implemented in or by one or more processors. In certain aspects, the first count percentage and the second count percentage are 2%. In certain aspects, the filter is a bilateral filter. In certain aspects, edges of the updated histogram are within a threshold percentage of the range of the pixel intensity values between the identified left bin and identified right bin. In certain aspects, the threshold percentage is 80%.

In some embodiments a method is provided for selecting a representative region of interest for an input image. The method typically includes receiving an input image, dividing the input image into M regions, identifying one or more of the M regions on which to perform local analysis, performing local analysis on each of the one or more identified regions, and selecting one of the one or more identified regions as a representative region based on results of the local analysis. In certain aspects, dividing the input image into M regions includes superimposing a grid onto the input image. In certain aspects, the one or more identified regions includes a plurality of regions proximal to a center of the grid. In certain aspects, the one or more identified regions includes a plurality of regions proximal to outside edges of the grid. In certain aspects, performing local analysis on a region comprises fitting a Gaussian curve to a histogram of pixel intensity associated with the region. In certain aspects, selecting one of the one or more identified regions as the representative region comprises, for each of the one or more identified regions: fitting a Gaussian curve to a histogram of pixel intensity values of the region, determining whether a first percentage of all of the pixel intensity values in the region is accounted for in the histogram, determining whether a second percentage of all of the pixel intensity values in the region is below or within the Gaussian curve in the histogram, determining whether a third percentage of all of the pixel intensity values in the region is outside the Gaussian curve in the histogram, assigning a quality score to each of the one or more identified regions, and selecting one region as the representative region based on the quality scores. In certain aspects, selecting one of the one or more identified regions as the representative region comprises calculating an intensity match ratio or a frequency match ratio.

In some embodiments, a processor-implemented method is provided for applying a filter to an image. The method typically includes selecting a first region of the image, and generating an initial histogram of pixel intensity values in the first region, wherein the histogram includes N bins. The method also typically includes a) identifying a first bin as a bin having a greatest count of pixel intensity values; b) identifying a left bin as a closest bin to the left of the first bin in the histogram that has a count that is less than a first count percentage of the greatest count; c) identifying a right bin as a closest bin to the right of the first bin in the histogram that has a count that is less than a second count percentage of the greatest count; and d) determining whether edges of the histogram are within a threshold percentage of the range of pixel intensity values between the identified left bin and identified right bin. If edges of the histogram are within a threshold percentage of the range of pixel intensity values between the identified left bin and identified right bin, the method includes fitting a Gaussian curve onto the histogram, applying a filter to the image based on parameters of the Gaussian curve, and if edges of the histogram are not within a threshold percentage of the range of pixel intensity values between the identified left bin and identified right bin, the method includes generating an updated histogram of pixel intensity values having a range between the identified left bin and identified right bin, and repeating steps a)-d) using the updated histogram. The method also typically includes outputting or displaying data representing the filtered image data. The method steps are typically implemented in or by one or more processors.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 3A is a conceptual diagram of an input image and a region of interest, according to an example embodiment.

FIGS. 3B-3D are conceptual diagrams showing a histogram of pixel intensities in a region of interest, according to example embodiments.

FIGS. 12A-12C illustrate factors for determining a representative region, according to one embodiment.

DETAILED DESCRIPTION

Embodiments of the disclosure provide techniques for enhancing image quality. According to various embodiments, an adaptive and appropriately tuned bilateral filter is applied to image data. The bilateral filter reduces noise in the image while preserving edges. The bilateral filter includes a set of parameters that is based on or determined from the image data. In some implementations, the set of parameters can vary (widely in some cases) from image to image. Techniques are presented herein to determine the appropriate set of parameters to use when applying the bilateral filter. These techniques provide the ability to enhance image data having a high dynamic range. These techniques also provide the ability to reduce the file size (e.g., improve compression) of an image or images.

According to various embodiments, a technique for determining an optimal set of parameters for the bilateral filter is automatic and does not require manual user input or configuration. For example, the technique does not require a priori statistical data estimates, ranges or limits but rather, independently determines underlying data characteristics on a de novo basis.

Figure 1:
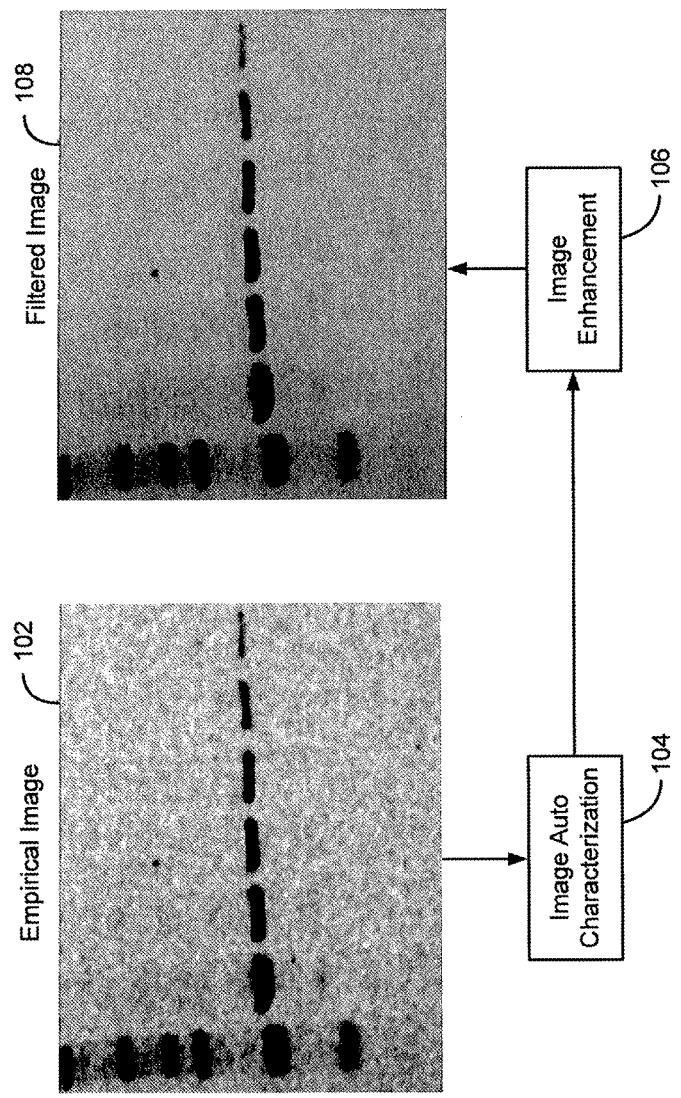
FIG. 1 is a block diagram of an example system for enhancing an image, according to an example embodiment.

FIG. 1 is a block diagram of an example system for enhancing an image, according to an example embodiment. As shown, an input image 102 is received. The input image 102 can be captured via any technically feasible imaging device. The input image 102 typically includes data representing a plurality of viewable pixels, the number of which is typically defined by the resolution of the image capture device or input device used. In one example, the input image 102 depicts a biological assay, e.g., biological western blot membrane. In other examples, the input image 102 may depict any image or information.

The input image 102 is received by an image characterization engine 104. As described in greater detail herein, the image characterization engine 104 analyzes the input image 102 to identify an optimal set of filter parameters to use when applying a filter to the input image 102. The set of filter parameters is transmitted to an image enhancement engine 106 that applies a filter to the input image 102 based on the set of filter parameters to achieve an output image 108. In one embodiment, the filter is a bilateral filter. In other embodiments, other filters can be applied to the input image 102. According to various embodiments, each of the image characterization engine 104 and/or the image enhancement engine 106 can be implemented in hardware, software, and/or a combination of hardware and software.

Figure 2:
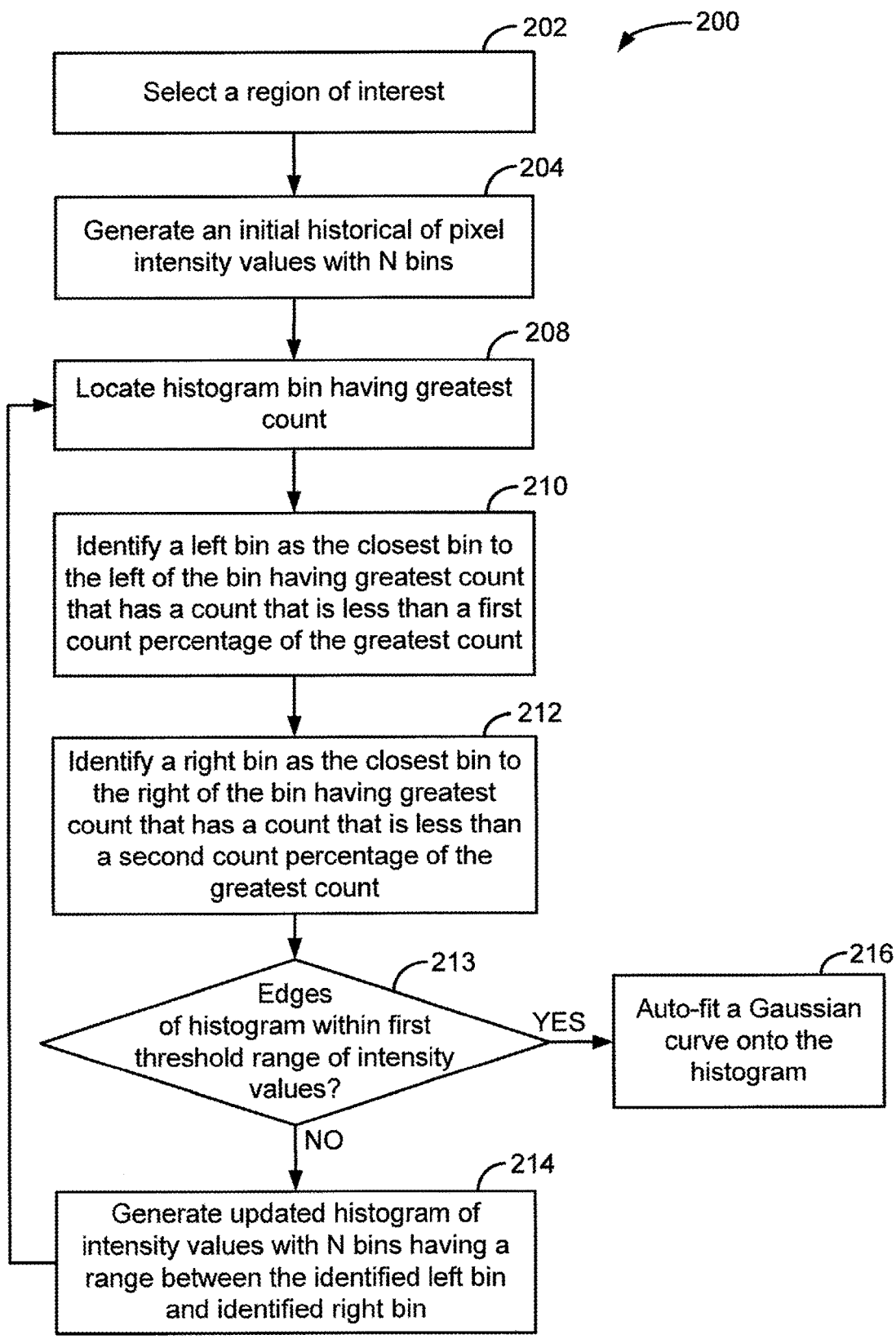
FIG. 2 is a flow diagram for fitting a Gaussian curve to a distribution of pixel intensity values in a region of interest, according to an example embodiment.

FIG. 2 is a flow diagram for fitting a Gaussian curve to a distribution of pixel intensity values in a region of interest, according to an example embodiment. Advantageously the present embodiments do not require a priori selection of a region of interest, but rather, independently determine region(s) from which data characterization can be most accurately extracted, as will be discussed in more detail below. Also, as will be shown in more detail below, data background characteristic extraction is not dependent on selection (automatic or otherwise) of region(s) containing exclusively background (no signal or artifacts).

As shown, the method 200 begins at step 202, where an analytics engine, such as the image characterization engine 104 in FIG. 1, automatically selects a region of interest of an input image. In some embodiments, the region of interest can be any arbitrary region of an input image. FIG. 3A is a conceptual diagram of an input image and a region of interest (ROI) 302, according to an example embodiment.

In other embodiments, as described below, a grid is superimposed onto the input image and one or more regions in the grid can serve as the region of interest.

At step 204, the analytics engine generates an initial histogram of pixel intensity values with N bins for the selected region 302. FIG. 3B illustrates an example of an initial histogram for the selected region 302. The value of N can be configurable. In one example, N is 100 bins. The vertical axis of the histogram corresponds to a count of the number of pixels in each intensity bin. The initial range (e.g., min, max) of the bins, e.g., values of the left- and right-most bins, in the initial histogram may be preconfigured, for example, a range of between 0.0 (min) and $8 \times 10^4$ (max). Typically, the initial range will be the maximum possible range (min to max intensity for the selected region), however, the initial range can be other than the maximum possible range for the selected region. The width of each bin can be automatically determined based on the bin range. As shown in the example in FIG. 3B, most of the pixels have intensity values to the far left side of the initial histogram.

At step 208, the analytics engine locates a histogram bin having the greatest count of pixel intensity values. At step 210, the analytics engine identifies a left bin as the closest bin to the left of the bin having the greatest count that itself has a count that is less than a first count percentage of the greatest count, e.g., a first count percentage less than 2% of the greatest count. The first count percentage value of 2% is merely an example. The first count percentage is configurable and can be any percentage amount. At step 212, the analytics engine identifies a right bin as the closest bin to the right of the bin having the greatest count that itself has a count that is less than a second count percentage of the greatest count, e.g., a second count percentage less than 2% of the greatest count. The second count percentage value of 2% is merely an example. The second count percentage is configurable and can be any percentage amount. In some embodiments, the first and second count percentages are the same. In other embodiments, the first and second count percentages are different.

At step 213, the analytics engine determines whether the edges of the histogram are within a first threshold range of intensity values, e.g., 80% of intensity values for the entire region of interest. The value of 80% is merely an example. This percentage is configurable and can be any percentage amount, e.g., 50%, 60%, etc.

If the analytics engine determines that the edges of the histogram are not within the first threshold range of intensity values for the entire region of interest, then the method 200 proceeds to step 214. As shown in FIG. 3B, the edges of the histogram are not within 80% of the range of intensity values for the entire region of interest.

At step 214, the analytics engine generates an updated histogram of intensity values with N bins having a range between the identified left bin and the identified right bin. In this manner, via steps 208-214, the analytics engine is effectively "zooming in" onto the highest peak in the distribution of pixel intensity values. FIG. 3C shows an example of zooming in onto the distribution shown in the histogram in FIG. 3B.

After the updated histogram is generated at step 214, the method 200 returns to steps 208-213, where the analytics engine determines whether the edges of the histogram are within the first threshold, e.g., a threshold percentage of 80% of a range of intensity values for the entire region of interest. If not, then the method 200 continues to repeat the steps 208-214 until the query at step 213 is satisfied. FIG. 3D shows an example of a histogram where the edges of the histogram are within 80% of a range of intensity values for the entire region of interest.

If, at step 213, the analytics engine determines that the edges of the histogram are within 80% of the range of intensity values for the entire region of interest, then the method 200 proceeds to step 216. At step 216, the analytics engine fits a Gaussian curve onto the histogram. As shown in FIG. 3D, a Gaussian curve 304 is fit to the data shown in the histogram. Generating the Gaussian curve can be performed using any technically feasible technique, one of which is described below in FIGS. 10-11. The Gaussian curve includes an amplitude, mean, and variance. In one embodiment, the amplitude, mean, and variance of the Gaussian curve correspond to a set of parameters to be used by a bilateral filter to be applied to the input image to improve the image quality.

According to some embodiments, the Gaussian curve that is fit to the data set depends on which region of the input image is selected as the region of interest.

Figure 4:
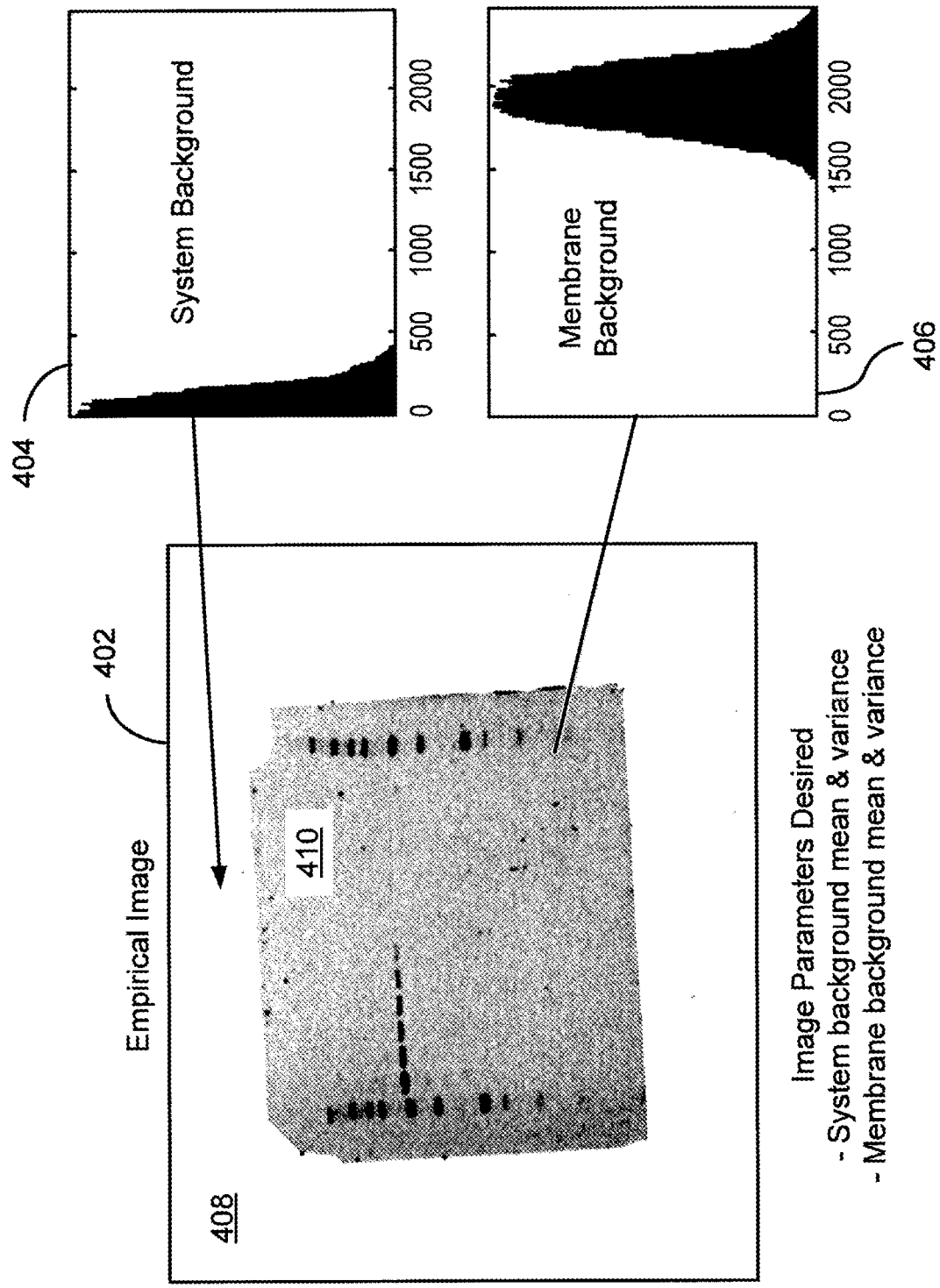
FIG. 4 is a conceptual diagram illustrating an example image showing a membrane placed on a platform, such as a slide, which contributes to a system background, according to an example embodiment.

FIG. 4 is a conceptual diagram illustrating an example image 402 showing a membrane 410 placed on a platform, such as a slide, which contributes to a system background 408, according to an example embodiment. Histogram 404 shows a distribution of pixel intensity values of a region of interest associated with the system background 408. Histogram 406 shows a distribution of pixel intensity values of a region of interest associated with the membrane 410. As shown, the histograms 404, 406 have different distributions. As such, if a Gaussian curve were to be fitted to each of the histograms 404, 406, the parameters of the two Gaussian curves would be different.

Figure 5:
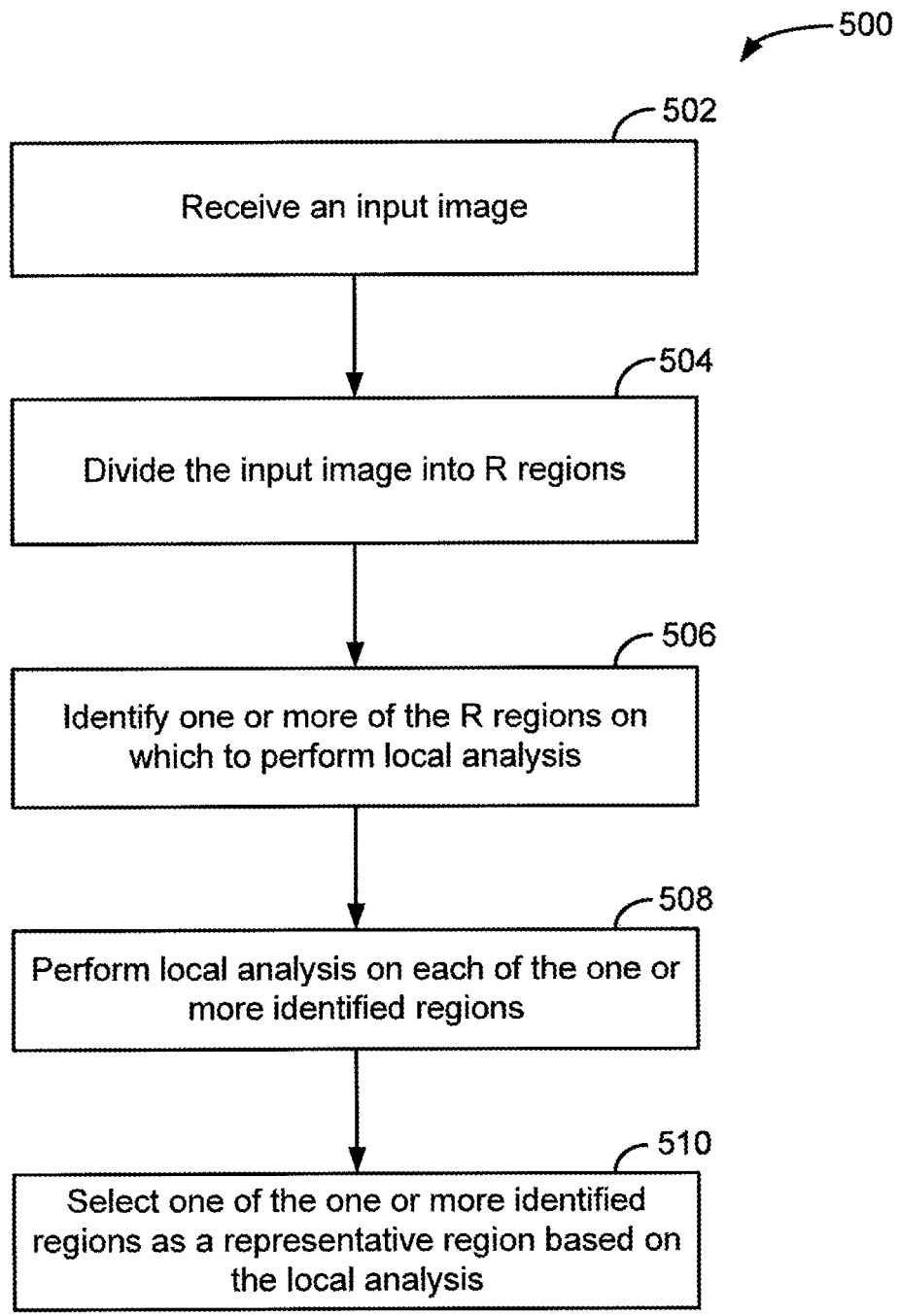
FIG. 5 is a flow diagram for selecting a representative region of interest for an input image, according to an example embodiment.

FIG. 5 is a flow diagram for selecting a representative region of interest for an input image, according to an example embodiment.

Figure 6:
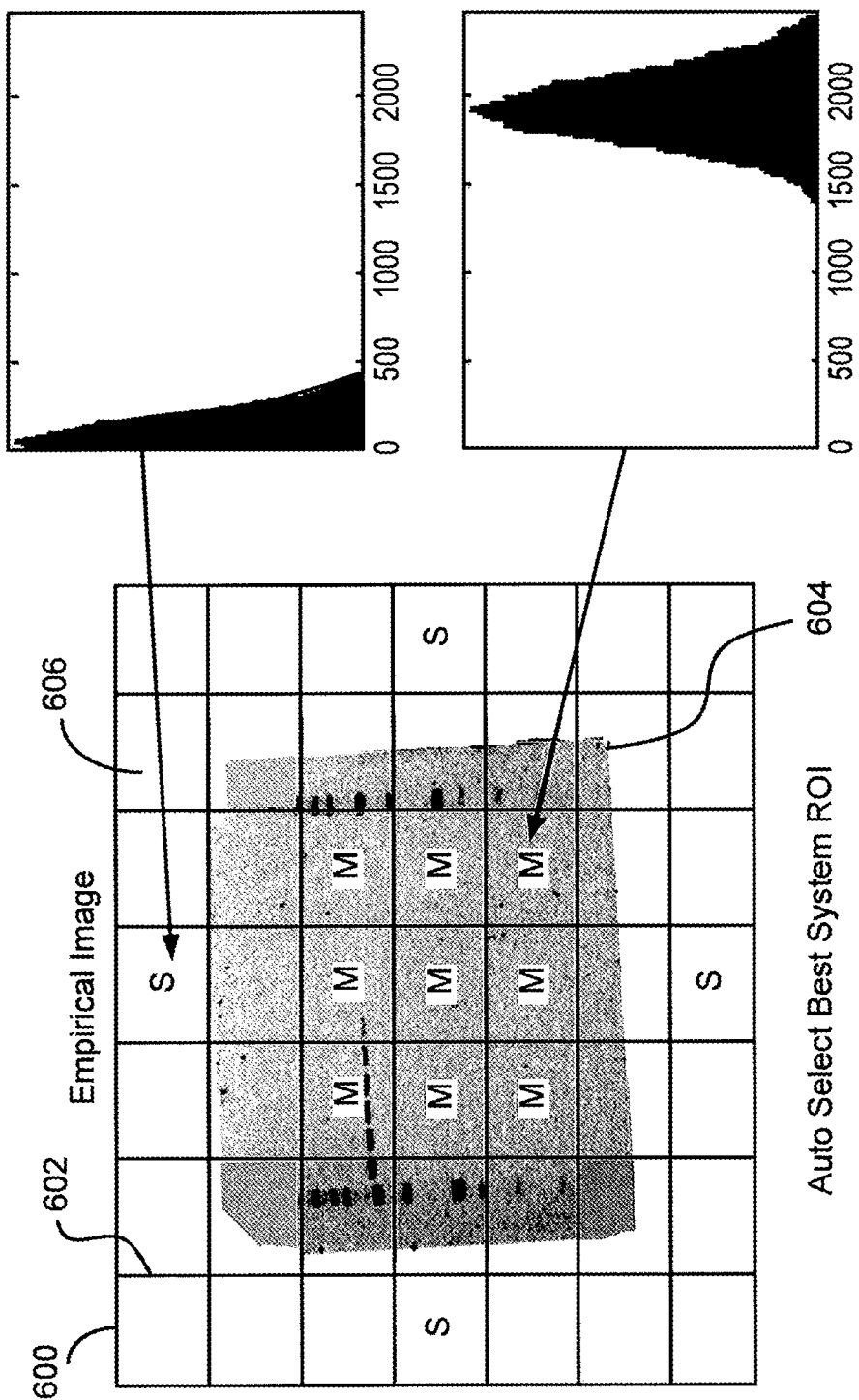
FIG. 6 is a conceptual diagram illustrating an input image and a grid superimposed onto the input image, according to an example embodiment.

As shown, the method 500 begins at step 502, where an analytics engine, such as the image characterization engine 104 in FIG. 1, receives an input image, e.g., data representing an image. At step 504, the analytics engine divides the input image into R regions. FIG. 6 is a conceptual diagram illustrating an input image 600 and a grid 602 superimposed onto the input image 600, according to an example embodiment. In the example shown, the grid 602 is a 7×7 grid, thus R=49.

At step 506, the analytics engine identifies one or more of the R regions on which to perform local analysis. As described, in one example, the input image 600 shows membrane 604 with a system background 606. Certain regions of the input image created as a result of superimposing the grid 602 onto the input image 600 are selected for local analysis. In one implementation, four regions are selected for local analysis as being "system background" regions and nine regions are selected for local analysis as being "membrane" regions. For example, a top-middle, a left-middle, a bottom-middle, and a right-middle region are selected for local analysis as being "system background" regions, and the nine center regions are selected for local analysis as being "membrane" regions. In other embodiments, various techniques for overlaying a grid onto the image may be implemented. For example, an X-by-X grid may be overlaid onto the image. Then, a Y-by-Y grid may also be overlaid on the image, where Y=X−1. As such, multiple grids can be overlaid onto the image to provide for more cells or regions to be analyzed. Overlaying multiple grids, and thus providing more regions, can provide for a higher probability of obtaining better results.

At step 508, the analytics engine performs local analysis on each of the one or more identified regions. The local analysis performed for each region comprises fitting a Gaussian curve to a distribution of pixel intensity values in the region, as described in the method 200 in FIG. 2. At step 510, the analytics engine selects one of the one or more identified regions as a representative region based on the local analysis. In one embodiment, the parameters of a bilateral filter that is applied to the entire image is based on the Gaussian parameters of a Gaussian curve that is fit to a distribution of pixel intensity values of the representative region.

Figure 7:
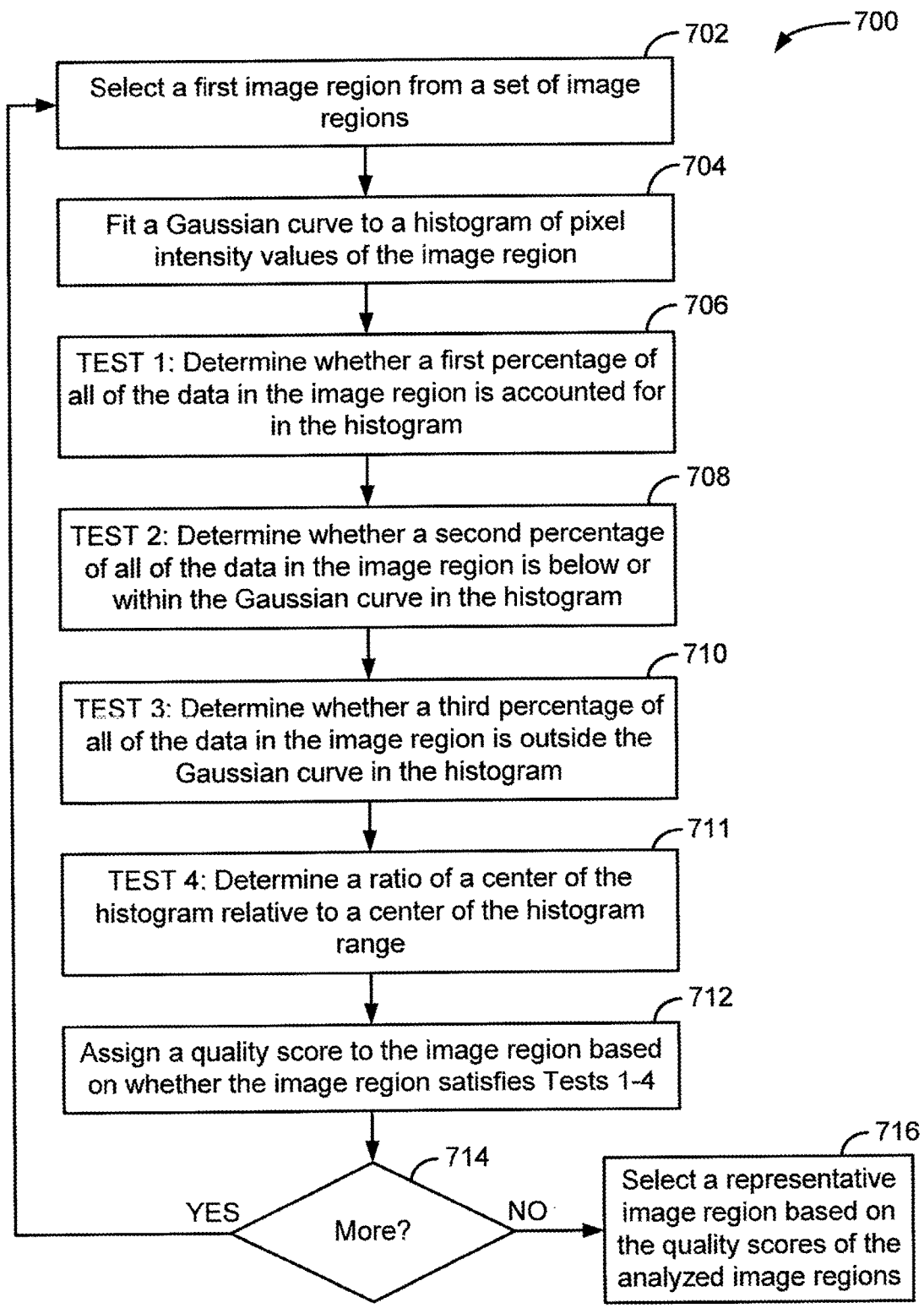
FIG. 7 is a flow diagram of method steps for selecting a representative image region based on local analysis of one or more image regions, according to an example embodiment.

FIG. 7 is a flow diagram of method steps for selecting a representative image region based on local analysis of one or more image regions, according to an example embodiment.

As shown, the method 700 begins at step 702, where an analytics engine, such as the image characterization engine 104 in FIG. 1, selects a first image region from a set of image regions to analyze. As described, in one example, a top-middle, a left-middle, a bottom-middle, and a right-middle region are selected for local analysis as being "system background" regions. In another example, the nine center regions are selected for local analysis as being "membrane" regions. One of these image regions is selected at step 702.

At step 704, the analytics engine fits a Gaussian curve to a histogram of pixel intensity values of the image region. An example implementation for fitting a Gaussian curve to the histogram of pixel intensity values of the image region is described in FIG. 2.

At step 706, the analytics engine determines whether a first percentage of all of the data in the image region is accounted for in the histogram (Test 1). In one example, the value of the first percentage is 60%. This percentage is configurable and can be any percentage amount. As described in FIG. 2, steps 208-214, the method 200 iteratively zooms in onto the highest peak in the histogram. If there is another peak that is remote from the highest peak in the histogram, then the other peak is not accounted for in the Gaussian distribution and curve. If the amount of data outside the range of the histogram is over the first percentage, Test 1 fails for the image region. Otherwise, Test 1 passes for the image region.

At step 708, the analytics engine determines whether a second percentage of all of the data in the image region is below or within the Gaussian curve in the histogram (Test 2). In one example, the value of the second percentage is 40%. This percentage is configurable and can be any percentage amount. If at least the second percentage of the total data in the image region is below or within the Gaussian curve, Test 2 passes for the image region. Otherwise, Test 2 fails for the image region.

At step 710, the analytics engine determines whether a third percentage of all of the data in the image region is outside the Gaussian curve in the histogram (Test 3). In one example, the value of the third percentage is 10%. This percentage is configurable and can be any percentage amount. If more than the third percentage of the total data in the image region is outside the Gaussian curve, Test 3 fails for the image region. Otherwise, Test 3 passes for the image region.

At step 711, the analytics engine determines a ratio of a location of the center of the histogram to a location of the center of the histogram range (Test 4). In one embodiment, the center of the histogram comprises the bin with the greatest count. In one embodiment, Test 4 is referred to as a "peak location test." In some embodiments, better results are achieved when the histogram is centered within the histogram range. In one embodiment, Test 4 is passed if the ratio of a location of the center of the histogram to a location of the center of the histogram range is within a threshold range amount. Test 4 fails if the ratio of a location of the center of the histogram to a location of the center of the histogram range is not within the threshold range amount.

At step 712, the analytics engine assigns a quality score to the image region based on whether the image region satisfies Tests 1-4. In one example, an image region receives a point for each Test 1-4 that is passed.

At step 714, the analytics engine determines whether there are more image regions to analyze. If yes, the method 700 returns to step 702, described above. If not, then the method 700 proceeds to step 716.

At step 716, the analytics engine selects a representative image region based on the quality scores of the analyzed image regions. In one embodiment, the analytics engine selects the image region with the highest score. If multiple regions have the same or similar (e.g., within 1% of each other) high scores, then the analytics engine selects one region as the representative region based on a least squares best fit (i.e., smallest sum of the square of the errors). According to various embodiments, any of Tests 1-4 is optional and can be omitted.

Figure 8A:
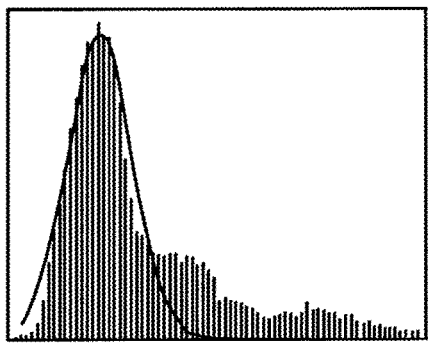
FIGS. 8A-8D are conceptual diagrams illustrating Gaussian curves fit to example histograms of distributions of pixel intensity values in different regions of interest, according to example embodiments.
Figure 8B:
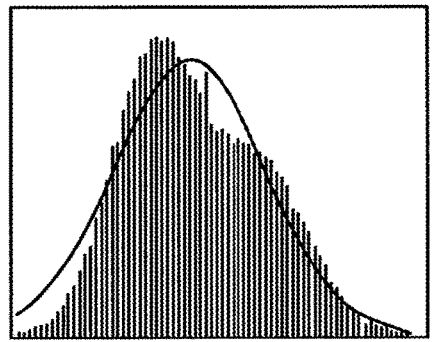
Figure 8C:
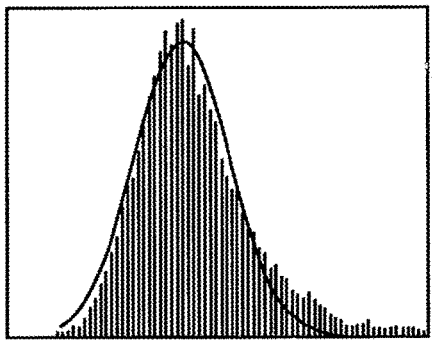
Figure 8D:
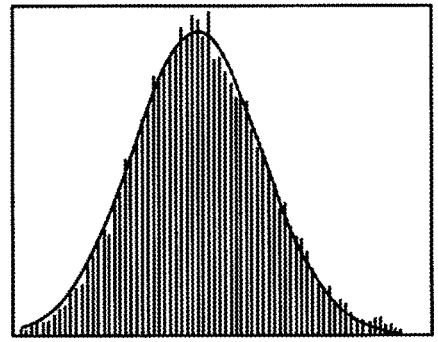

FIGS. 8A-8D are conceptual diagrams illustrating Gaussian curves fit to example histograms of distributions of pixel intensity values in different regions of interest, according to example embodiments. As shown in FIGS. 8A-8C, a certain number of values lie outside the Gaussian curve and/or the Gaussian curves are not centered in the histogram range. These deviations from the Gaussian curve may cause the distributions in FIGS. 8A-8C to fail one or more of Tests 1-4 described in FIG. 7. By contrast, FIG. 8D shows the best distribution of the distributions shown in FIGS. 8A-8D with respect to Tests 1-4, where a majority of the data is below or within the Gaussian curve and the center of the Gaussian curve is near the center of the histogram range.

As shown in FIG. 6, in one embodiment, one or more regions are selected as "system background" regions and a first representative region is selected as a representative system region, and one or more other regions are selected as "membrane" regions and a second representative region is selected as a representative background region. The method 700 described in FIG. 7 can be applied to the set of "system" regions and the set of "membrane" regions separately.

In one embodiment, if there is a membrane region that satisfies each of Tests 1-4, then the parameters of the Gaussian curve representing such a membrane region are used as the filter parameters of the bilateral filter applied to the entire image. If there is no membrane region that satisfies each of Tests 1-4, then a system background region that satisfies each of Tests 1-4 is selected. The parameters of the Gaussian curve representing such a system background region are used as the filter parameters of the bilateral filter applied to the entire image. If there is no membrane region or system background region that satisfies each of Tests 1-4, then a bilateral filter is not applied to the input image.

Figure 12C:
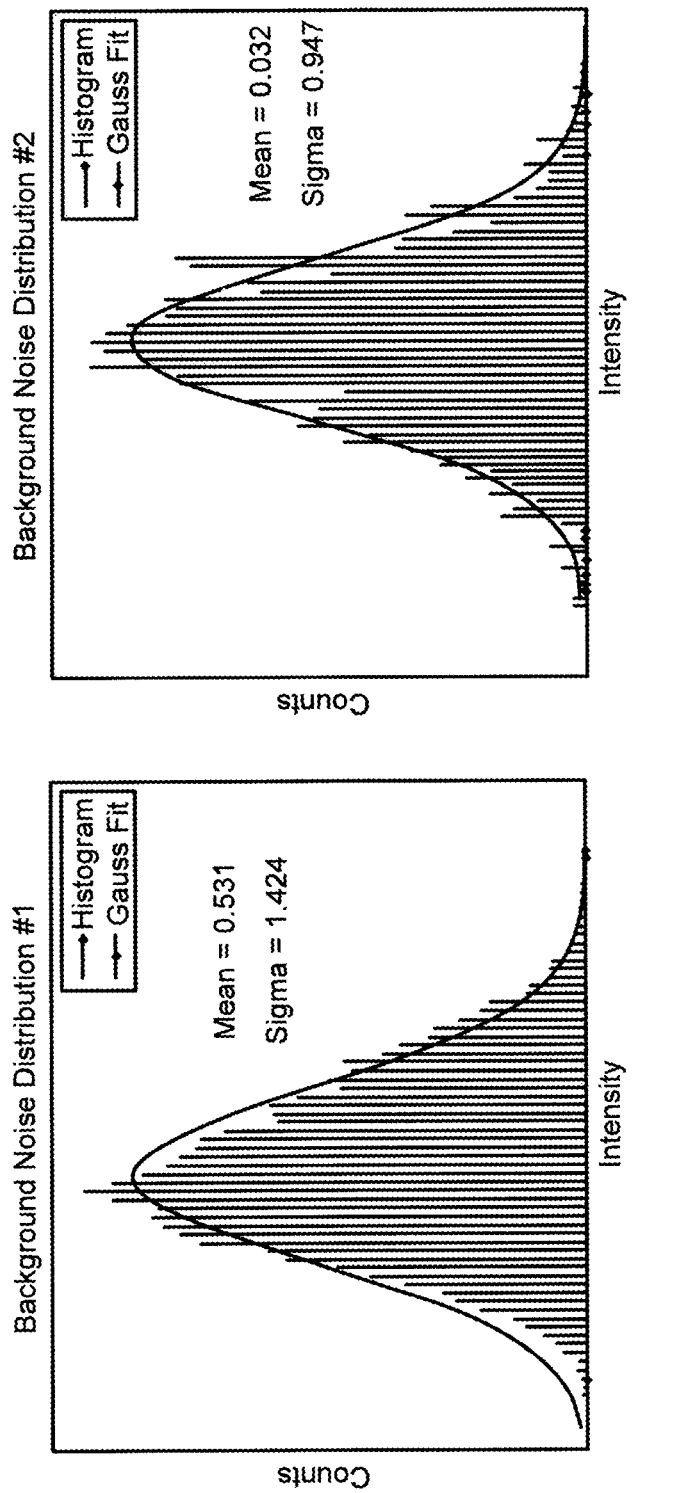

Tests 1-4 in FIG. 7 describe one embodiment for identifying a region with the best fit. In another embodiment, two ratios can be used to determine best fit: an intensity match ratio and a frequency match ratio. These quality ratios are referred to as "Q1" (intensity match ratio) and "Q2" (frequency match ratio) in FIGS. 12A-12C. FIG. 12A provides an equation for calculating an intensity match ratio, according to one embodiment. FIG. 12B provides an equation for calculating a frequency match ratio, according to one embodiment. As shown in FIG. 12C, for two different regions, the Q1 metric for both regions is similar: i.e., Q1=0.8705 for a first region, and Q1=0.8544 for a second region. However, the Q2 values for the two distributions are not similar. For the first sample, Q2=0.2422, whereas for the second region, Q2=0.7200. In one implementation, the second region is selected as the representative region based on having a similar Q1 score, but a better Q2 score.

Figure 13:
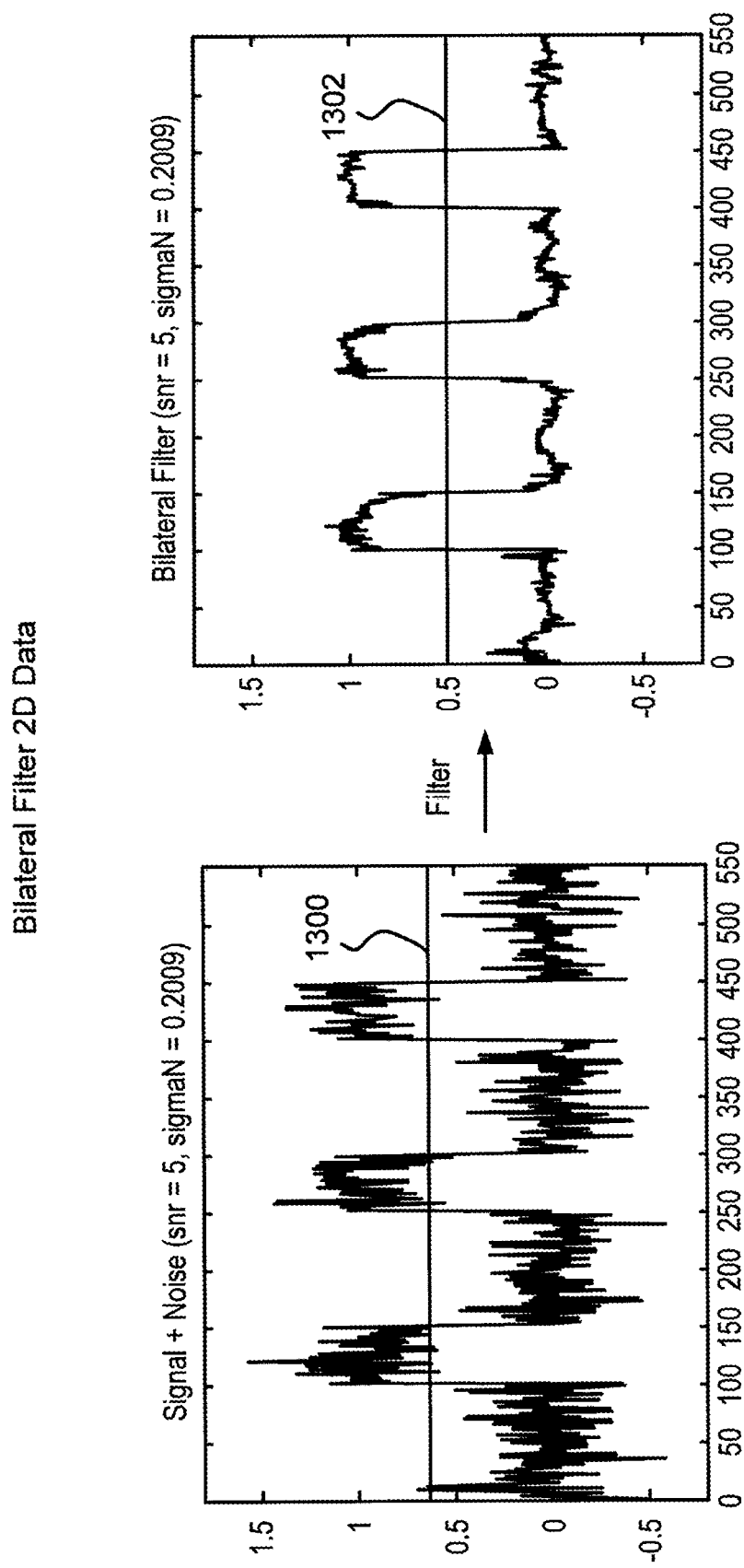
FIG. 13 is a conceptual diagram illustrating applying a bilateral filter to a signal, according to one embodiment.

Although the embodiments of the disclosure described above are directed to applying a bilateral filter to image data, the same technique and approach can be used to filter lower dimensional data sets. For example, the bilateral filter approach described herein can be applied to a trace or signal. FIG. 13 is a conceptual diagram illustrating applying a bilateral filter to a signal, according to one embodiment. As shown in the image on the left, the signal includes a large amount of noise, i.e., has a signal-to-noise ratio of 5. A threshold line 1300 can be applied to the signal to remove noise, such that only those components of signal that are above the line 1300 are maintained. However, setting an appropriate threshold line 1300 in the noisy signal on the left in FIG. 13 is difficult to achieve such that the signal is preserved and noise is eliminated. This is because some of the noise may fall above the threshold line 1300 and some of the signal may fall below the threshold line 1300. If a bilateral filter is applied to the signal, as disclosed herein, then the signal is much cleaner as shown in the image on the right in FIG. 13, i.e., the signal can be easily distinguished from the noise. A threshold line 1302 can be applied to the signal to remove noise, such that only those components of signal that are above the line 1300 are maintained. In the example shown, placing a line at 0.5 removes the noise yet preserves the signal. Placing a line at 0.5 in the image on the left, however, does not achieve good results because some signal is lost and some noise is maintained.

Figure 9:
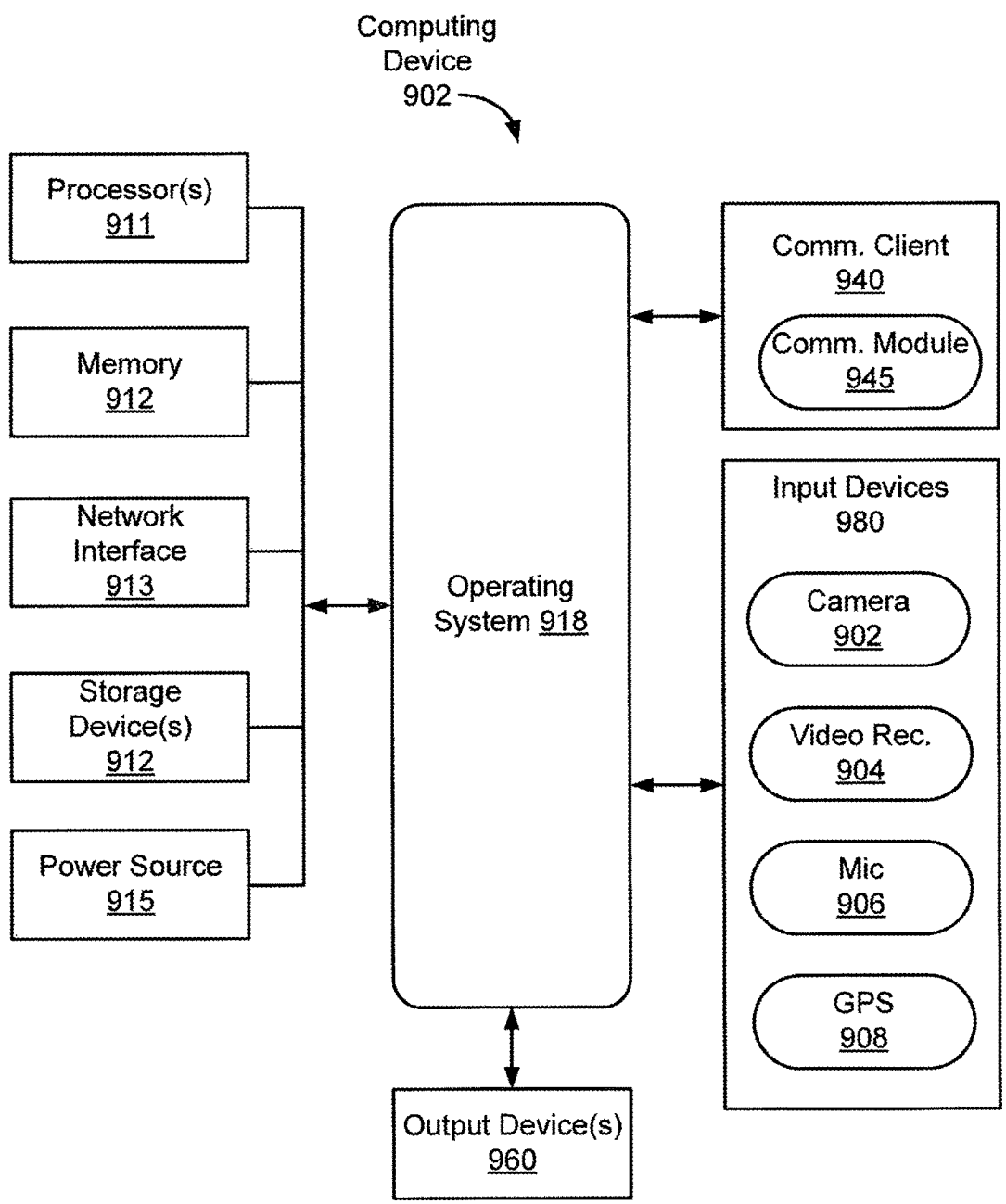
FIG. 9 is a block diagram of example functional components for a computing device configured to analyze an input image and apply a bilateral filter to the input image, according to one embodiment.

FIG. 9 is a block diagram of example functional components for a computing system or device 902 configured to analyze an input image and apply a bilateral filter to the input image, according to one embodiment. One particular example of computing device 902 is illustrated. Many other embodiments of the computing device 902 may be used. In the illustrated embodiment of FIG. 9, the computing device 902 includes one or more processor(s) 911, memory 912, a network interface 913, one or more storage devices 914, a power source 915, output device(s) 960, and input device(s) 980. The computing device 902 also includes an operating system 918 and a communications client 940 that are executable by the computing device 902. Each of components 911, 912, 913, 914, 915, 960, 980, 918, and 940 is interconnected physically, communicatively, and/or operatively for inter-component communications in any operative manner.

As illustrated, processor(s) 911 are configured to implement functionality and/or process instructions for execution within computing device 902. For example, processor(s) 911 execute instructions stored in memory 912 or instructions stored on storage devices 914. Memory 912, which may be a non-transient computer-readable storage medium, is configured to store information within computing device 902 during operation. In some embodiments, memory 912 includes a temporary memory, area for information not to be maintained when the computing device 902 is turned OFF. Examples of such temporary memory include volatile memories such as random access memories (RAM), dynamic random access memories (DRAM), and static random access memories (SRAM). Memory 912 maintains program instructions for execution by the processor(s) 911. Example programs can include the image characterization engine 104 and/or the image enhancement engine 106 in FIG. 1.

Storage devices 914 also include one or more non-transient computer-readable storage media. Storage devices 914 are generally configured to store larger amounts of information than memory 912. Storage devices 914 may further be configured for long-term storage of information. In some examples, storage devices 914 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 902 uses network interface 913 to communicate with external devices via one or more networks. Network interface 913 may be a network interface card, such as an Ethernet card, an optical transceiver, a radio frequency transceiver, or any other type of device that can send and receive information. Other non-limiting examples of network interfaces include wireless network interface, Bluetooth®, 9G and WiFi® radios in mobile computing devices, and USB (Universal Serial Bus). In some embodiments, the computing device 902 uses network interface 913 to wirelessly communicate with an external device or other networked computing device.

The computing device 902 includes one or more separate or integrated input devices 980. Some input devices 980 are configured to sense the environment and capture images or other signals. Some input devices 980 are configured to receive input from a user through tactile, audio, video, or other sensing feedback. Non-limiting examples of input devices 980 include a presence-sensitive screen, a mouse, a keyboard, a voice responsive system, camera 902, a video recorder 904, a microphone 906, a GPS module 908, or any other type of device for detecting a command from a user or for sensing the environment. In some examples, a presence-sensitive screen includes a touch-sensitive screen.

One or more output devices 960 are also included in computing device 902. Output devices 960 are configured to provide output to another system or device or to a user using tactile, audio, and/or video stimuli. Output devices 960 may include a display screen (e.g., a separate screen or part of the presence-sensitive screen), a sound card, a video graphics adapter card, or any other type of device for converting a signal into an appropriate form understandable to humans or machines. Additional examples of output device 960 include a speaker, a cathode ray tube (CRT) monitor, a liquid crystal display (LCD), or any other type of device that can generate intelligible output to a user. In some embodiments, a device may act as both an input device and an output device.

The computing device 902 includes one or more power sources 915 to provide power to the computing device 902. Non-limiting examples of power source 915 include single-use power sources, rechargeable power sources, and/or power sources developed from nickel-cadmium, lithium-ion, or other suitable material.

The computing device 902 includes an operating system 918. The operating system 918 controls operations of the components of the computing device 902. For example, the operating system 918 facilitates the interaction of communications client 940 with processors 911, memory 912, network interface 913, storage device(s) 914, input device 180, output device 160, and power source 915.

As also illustrated in FIG. 9, the computing device 902 includes communications client 940. Communications client 940 includes communications module 945. Each of communications client 940 and communications module 945 includes program instructions and/or data that are executable by the computing device 902. For example, in one embodiment, communications module 945 includes instructions causing the communications client 940 executing on the computing device 902 to perform one or more of the operations and actions described in the present disclosure. In some embodiments, communications client 940 and/or communications module 945 form a part of operating system 918 executing on the computing device 902.

According to various embodiments, one or more of the components shown in FIG. 9 may be omitted from the computing device 902.

Figure 10:
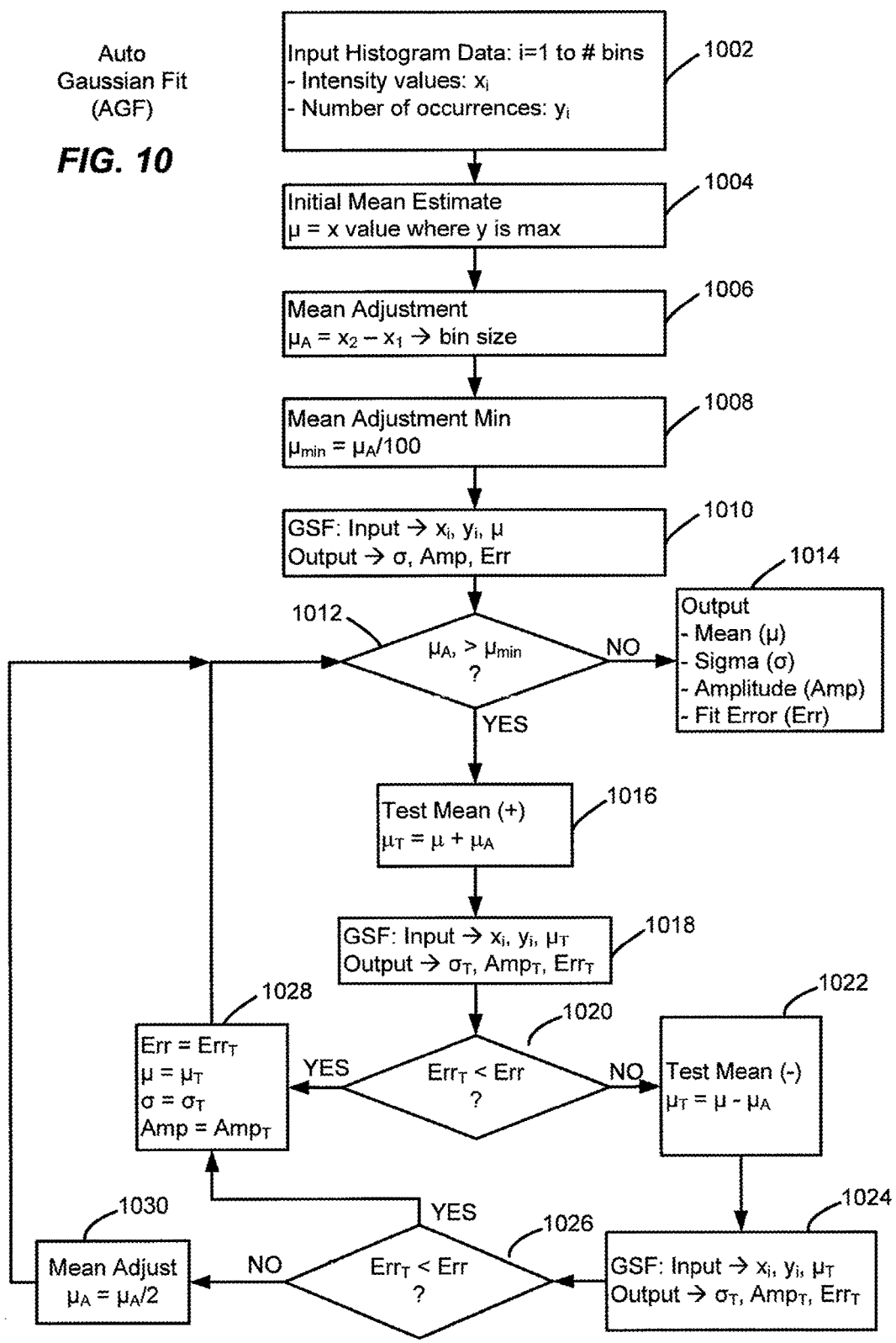
FIG. 10 is a flow diagram of method steps for auto fitting a Gaussian curve to a distribution, according to one embodiment.

FIG. 10 is a flow diagram of method steps for auto fitting a Gaussian curve to a distribution, according to one embodiment. At step 1002, histogram data is input. At step 1004, an initial mean is estimated. At step 1006, a mean adjustment is calculated. At step 1008, a mean adjustment minimum (min) is computed. At step 1010, a Gaussian Sigma Fit (GSF) operation is performed. One example technique for performing a GSF operation is described in FIG. 11, described in more detail below. At step 1012, it is determined whether the mean adjustment is greater than the mean adjustment min. If not, then at step 1014, the mean, sigma (standard deviation), amplitude, and fit error are output. In one embodiment, the mean, sigma, amplitude, and fit error output at step 1014 may be used to determine the optimal set of filter parameters to use when applying a filter to an input image, as described above in FIG. 1. If yes, then at step 1016, a positive test mean is calculated. At step 1018, the GSF operation is performed with the positive test mean. At step 1020, it is determined whether a test error is less than a least squares error. If yes, then at step 1028, the mean, sigma, amplitude, and fit error are each set to a test mean, test sigma, test amplitude, and test fit error, respectively. The method then returns to step 1012. If, at step 1020, the test error is not less than a least squares error, then at step 1022, a negative test mean is calculated. At step 1024, the GSF operation is performed with the negative test mean. At step 1026, it is determined whether a test error is less than a least squares error. If yes, then the method proceeds to step 1028 described above. If, at step 1026, the test error is not less than the least squares error, then at step 1030, the mean adjustment is adjusted to half the mean adjustment and the method proceeds to step 1012 described above.

Figure 11:
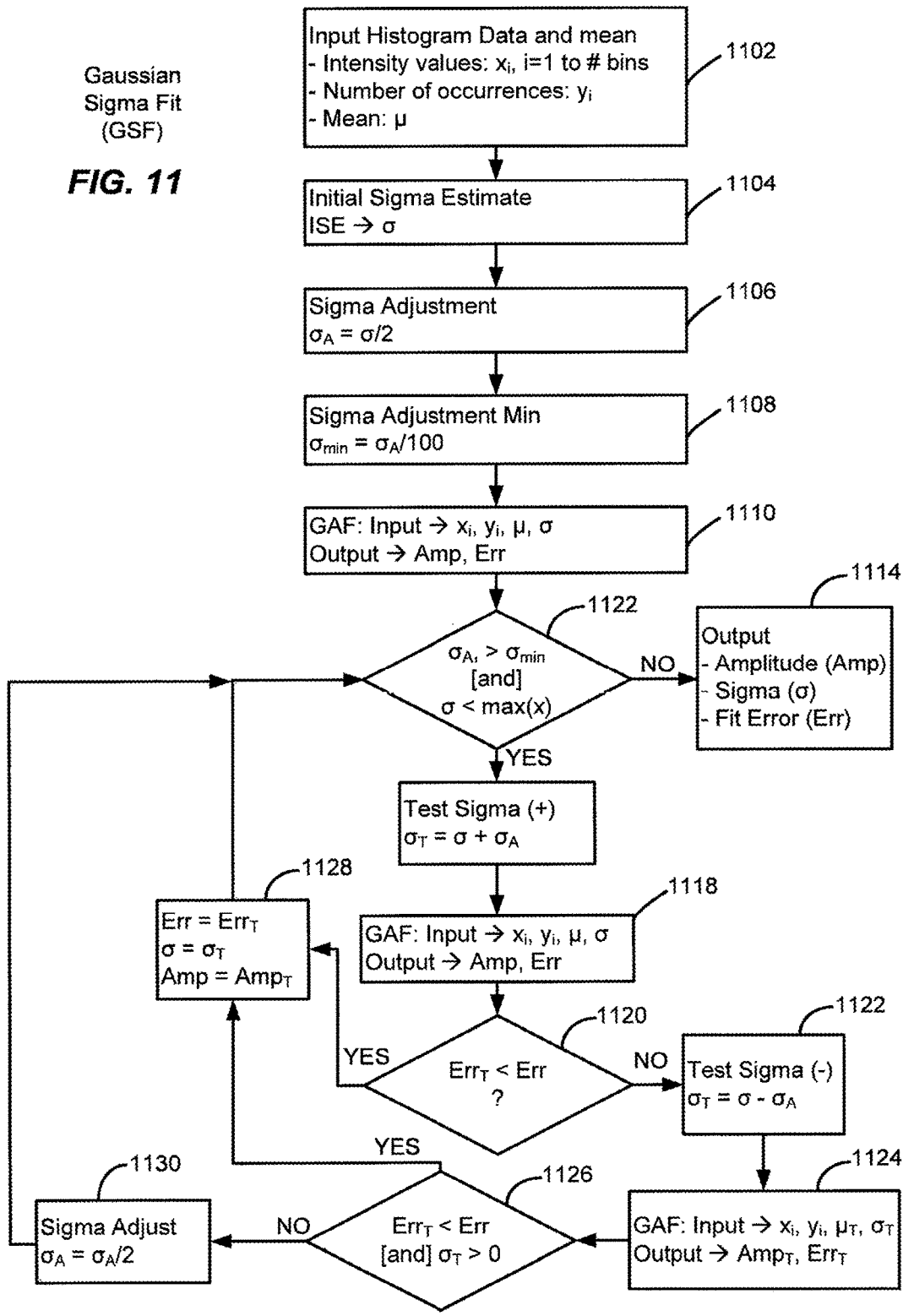
FIG. 11 is a flow diagram of method steps for performing a Gaussian Sigma Fit (GSF) operation, according to one embodiment.

FIG. 11 is a flow diagram of method steps for performing a Gaussian Sigma Fit (GSF) operation, according to one embodiment. At step 1102, histogram data is input. At step 1104, an Initial Sigma Estimate (ISE) operation is performed. One example technique for performing ISE is described below. At step 1106, a sigma adjustment is set equal to half the initial sigma estimate. At step 1108, a sigma adjustment minimum (min) is computed. At step 1110, a Gaussian Amplitude Fit (GAF) operation is performed. One example technique for performing GAF is described below. At step 1112, it is determined whether the sigma adjustment is greater than the sigma adjustment min, and whether the sigma is less than a maximum (max) intensity value. If not, then at step 1114, sigma (standard deviation), amplitude, and fit error are output. If yes, then at step 1116, a positive test sigma is calculated. At step 1118, the GAF operation is performed with the positive test sigma. At step 1120, it is determined whether a test error is less than a least squares error. If yes, then at step 1128, sigma, amplitude, and fit error are each set to a test mean, test sigma, test amplitude, and test fit error, respectively. The method then returns to step 1112. If, at step 1120, the test error is not less than the least squares error, then at step 1122, a negative test sigma is calculated. At step 1124, the GAF operation is performed with the negative test sigma. At step 1126, it is determined whether a test error is less than the least squares error, and whether the test sigma is greater than zero. If yes, then the method proceeds to step 1128 described above. If, at step 1126, the query fails, then at step 1130, the sigma adjustment is adjusted to half the sigma adjustment and the method proceeds to step 1112 described above.

In one embodiment, performing the Initial Sigma Estimate (ISE) operation includes: (a) locating a histogram bin having the greatest count, (b) identifying a second bin as the closest bin to the left or right of the bin having the greatest count that has a count that is less than a percentage (e.g. 60%) of the greatest count, and (c) setting the initial sigma estimate equal to the positive difference between the two identified bin locations (i.e., intensities).

In one embodiment, performing the Gaussian Amplitude Fit (GAF) operation includes the following inputs:
$x_i$=intensity values (histogram x-axis, i=1 to # bins)
$y_i$=number of occurrences (histogram, y-axis)
$\mu$=mean value
$\sigma$=standard deviation
The outputs of the GAF operation include:
amp=Gaussian amplitude
$g_i$=Gaussian equation data
$gFit_i$=Gaussian fit data
err=least squares error
In one embodiment, the following Equations 1-4 can be used to perform the GAF operation:

$$g_i = e^{-\frac{1}{2}\left(\frac{x_i-\mu}{\sigma}\right)^2}. \quad \text{(Equation 1)}$$

$$amp = \frac{\sum_{i=1}^{\#bins}(y_i \cdot g_i)}{\sum_{i=1}^{\#bins}((g_i)^2)}. \quad \text{(Equation 2)}$$

$$gFit_i = g_i \cdot amp. \quad \text{(Equation 3)}$$

$$err = \sum_{i=1}^{\#bins}((y_i - gFit_i)^2). \quad \text{(Equation 4)}$$

The filtering techniques of the present disclosure also advantageously provide improved file compression, e.g., significantly reduced file size upon signal filtering. The filtering techniques allow for the compression algorithm used to run more efficiently. Specific examples, depending on file type are presented in Table 1, below, which compares examples of unfiltered images being saved by a jpeg algorithm versus saving a filtered image using a jpeg algorithm:

TABLE 1

| File type | Unfiltered compressed file size | Filtered compressed file size |
|---|---|---|
| Digital Video | 15,865 KB | 2,257 KB |
| Second digital video-low light | 36,776 KB | 18,436 KB |
| Low light image | 155 KB | 78 KB |
| Pollen count close up | 293 KB | 109 KB |
| Zoomed in low light image | 463 KB | 326 KB |
| Chemiluminescence image | 158 KB | 43 KB |

For example, in some embodiments, an image or image(s) are processed according to the above methodologies and a compressed image (e.g., compressed filtered image data) is stored to a memory for later use.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for selecting a representative region of interest for an input image, the method comprising:
receiving an input image;
dividing the input image into a plurality of regions;
identifying one or more of the plurality of regions on which to perform a local analysis;
performing the local analysis on each of the one or more identified regions; and
selecting one of the one or more identified regions as a representative region based on results of the local analysis;
wherein the selecting one of the one or more identified regions as the representative region comprises:
for each of the one or more identified regions:
fitting a Gaussian curve to a histogram of pixel intensity values of the region,
determining whether a first percentage of all of the pixel intensity values in the region is accounted for in the histogram,
determining whether a second percentage of all of the pixel intensity values in the region is below or within the Gaussian curve in the histogram,
determining whether a third percentage of all of the pixel intensity values in the region is outside the Gaussian curve in the histogram;
assigning a quality score to each of the one or more identified regions; and
selecting one region as the representative region based on the quality scores.

2. A method according to claim 1, wherein the dividing the input image into the plurality of regions comprises superimposing a grid onto the input image.

3. A method according to claim 2, wherein the one or more identified regions comprises a plurality of regions proximal to a center of the grid.

4. A method according to claim 2, wherein the one or more identified regions comprises a plurality of regions proximal to outside edges of the grid.

5. A method according to claim 1, wherein the performing the local analysis on a region comprises fitting a Gaussian curve to a histogram of pixel intensity associated with the region.

6. A method according to claim 1 wherein the selecting one of the one or more identified regions as the representative region comprises calculating an intensity match ratio or a frequency match ratio.

7. A non-transitory computer readable medium storing code, which when executed by one or more processors cause the one or more processors to implement a method of selecting a representative region of interest for an input image, the code including instructions to:
receive an input image;
divide the input image into a plurality of regions;
identify one or more of the plurality of regions on which to perform a local analysis;
perform the local analysis on each of the one or more identified regions; and
select one of the one or more identified regions as a representative region based on results of the local analysis;
wherein the instructions to select one of the one or more identified regions as the representative region include instructions to:

for each of the one or more identified regions:
fit a Gaussian curve to a histogram of pixel intensity values of the region,
determine whether a first percentage of all of the pixel intensity values in the region is accounted for in the histogram,
determine whether a second percentage of all of the pixel intensity values in the region is below or within the Gaussian curve in the histogram,
determine whether a third percentage of all of the pixel intensity values in the region is outside the Gaussian curve in the histogram;
assign a quality score to each of the one or more identified regions; and
select one region as the representative region based on the quality scores.

8. The non-transitory computer readable medium of claim 7, wherein the instructions to divide the input image into the plurality of regions comprises instructions to superimpose a grid onto the input image.

9. The non-transitory computer readable medium of claim 8, wherein the one or more identified regions comprises a plurality of regions proximal to a center of the grid.

10. The non-transitory computer readable medium of claim 8 wherein the one or more identified regions comprises a plurality of regions proximal to outside edges of the grid.

11. The non-transitory computer readable medium of claim 7, wherein the instructions to perform the local analysis on a region comprises instructions to fit a Gaussian curve to a histogram of pixel intensity associated with the region.

12. The non-transitory computer readable medium of claim 7, wherein the instructions to select one of the one or more identified regions as the representative region comprises instructions to calculate an intensity match ratio or a frequency match ratio.

* * * * *